United States Patent [19]

Schuhmann et al.

[11] Patent Number: 5,433,983
[45] Date of Patent: Jul. 18, 1995

[54] BIAXIALLY ORIENTED SEALABLE POLYPROPYLENE FILM HAVING IMPROVED BARRIER PROPERTIES

[75] Inventors: Detlef E. Schuhmann, Kiedrich; Herbert Peiffer, Mainz-Finthen; Ursula Murschall, Nierstein; Gunter Schloegl, Kelkheim, all of Germany

[73] Assignee: Hoechst Aktiengesellschaft, Frankfurt am Main, Germany

[21] Appl. No.: 154,029

[22] Filed: Nov. 18, 1993

Related U.S. Application Data

[63] Continuation-in-part of Ser. No. 734,157, Jul. 22, 1991, abandoned.

[30] Foreign Application Priority Data

Jul. 21, 1990 [DE] Germany .................. 40 32 272.7

[51] Int. Cl.⁶ .............................................. B29D 22/00
[52] U.S. Cl. .................................... 428/357; 428/349; 428/323; 428/336; 428/516
[58] Field of Search ............ 428/349, 500, 516, 35.7, 428/323, 336

[56] References Cited

U.S. PATENT DOCUMENTS

| | | | |
|---|---|---|---|
| 4,502,263 | 3/1985 | Crass et al. | 428/349 |
| 4,698,261 | 10/1987 | Bothe et al. | 428/204 |
| 4,786,533 | 11/1988 | Crass et al. | 428/13 |
| 4,921,749 | 5/1990 | Bossaert et al. | 428/216 |
| 5,091,237 | 2/1992 | Schloegl et al. | 428/215 |

FOREIGN PATENT DOCUMENTS

| | | |
|---|---|---|
| 0340579 | 11/1989 | European Pat. Off. . |
| 0420114 | 4/1991 | European Pat. Off. . |
| 3814942 | 11/1989 | Germany . |

OTHER PUBLICATIONS

Mueller, et al. 'Ullmanns Enzyklopaedie der Technischen Chemie' (Ullmann's Encyclopedia of Technical Chemistry) 4th edition, vol. 2, 1972, pp. 539–553.

*Primary Examiner*—Edith Buffalow
*Attorney, Agent, or Firm*—Foley & Lardner

[57] ABSTRACT

A sealable film is disclosed comprising (i) a base layer comprising polypropylene and a hydrocarbon resin and (ii) at least one top layer comprising (a) an ethylene/-propylene copolymer having an ethylene content of not more than about 10% by weight, (b) a propylene/1-butene copolymer, (c) a propylene/ethylene/alpha-olefin terpolymer, or (d) a blend of two or more of (a), (b) and (c), wherein at least one of said base layer and said at least one top layer contains an anti-blocking agent or lubricant and wherein the top layer contains a hydrocarbon resin. The film possesses improved barrier properties with respect to permeability to water vapor and oxygen, and which at the same time exhibits favorable slip properties and low shrink values.

53 Claims, No Drawings

BIAXIALLY ORIENTED SEALABLE POLYPROPYLENE FILM HAVING IMPROVED BARRIER PROPERTIES

This application is a continuation-in-part application of U.S. Ser. No. 07/734,157, filed Jul. 22, 1991, now abandoned. Ser. No. 07/734,157 is hereby incorporated by reference in its entirety.

BACKGROUND OF THE INVENTION

The present invention relates to a multilayer polypropylene film which has been produced by coextrusion and which has improved barrier properties with respect to permeability to water vapor and oxygen and simultaneously possesses favorable slip properties and low shrink values, in order to ensure good machine running properties.

EP-A-0,247,898 (=U.S. Pat. No. 4,921,749) describes a special polypropylene film which is claimed to possess, in particular, high-strength sealed seams and improved barrier properties.

DE-A-35 35 472 (=U.S. Pat. No. 4,786,533) is directed to polypropylene films where a certain amount of resin is incorporated in the base layer. However, the films disclosed therein possess, in particular, inadequate barrier properties towards water vapor, so that there has been a need for films having improved properties in this respect.

DE-A-38 14 942 describes polypropylene films containing a resin proportion of 5 to 40% by weight in their base layers, the resins having a softening point in the range of 80° to 125° C. These films are used as shrink-on labels, but exhibit disadvantages with respect to the barrier properties towards water vapor and oxygen.

SUMMARY OF THE INVENTION

Accordingly, it is an object of the present invention to provide a polypropylene film having improved barrier properties with respect to permeability to water vapor and oxygen, while at the same time having favorable slip properties and low shrink values.

Another object of the present invention is to provide a process for producing the improved film.

In accomplishing the foregoing objectives, there has been provided, in accordance with one aspect of the present invention, a sealable film comprising (i) a base layer comprising polypropylene and a hydrocarbon resin having a softening point of at least 140° C., and (ii) at least one top layer comprising a hydrocarbon resin and at least one of (a) an ethylene/propylene copolymer having an ethylene content of not more than about 10% by weight, (b) a propylene/1-butene copolymer, (c) a propylene/ethylene/alpha-olefin terpolymer, or (d) a blend of two or more of (a), (b) and (c), wherein at least one of said base layer and said at least one top layer contains an anti-blocking agent or lubricant.

In another embodiment of the invention, the hydrocarbon resin of the base layer has a softening point of less than 140° C., preferably from about 100° to 138° C.

In accordance with another aspect of the present invention there is provided a process for producing the foregoing film comprising the steps of: producing by coextrusion through a slot die a cast film comprising said base layer and at least one said top layer; chilling said cast film on a chill roll; and then orienting said film by biaxial stretching in the longitudinal and transverse directions.

In accordance with still another aspect of the present invention there is provided a process for producing a multilayer sealable film comprising the step of incorporating in at least one layer of said film a resin having a softening point of at least 140° C. or having a softening point of less than 140° C.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF THE PREFERRED EMBODIMENTS

In comparison to the films according to DE-A-38 14 942, the films according to the present invention display reduced deposits on the rollers.

Compared to the film disclosed in that publication, the film of the instant invention is distinguished by improved processability, in particular with respect to machine running properties on high-speed packaging machines and to thermal blocking. The term "machine running properties" refers to the ease of processing on high-speed packaging machines. For this purpose, the film must be neither too smooth nor too rough, for this might cause jams during the slitting operation. The stiffness of a film is also important in this respect. The term "thermal blocking" relates to the mutual adhesion of film-packaged goods, which is, above all, caused by the action of heat. The lower this mutual adhesion between two adjoining film layers under the action of heat is, the better is the thermal blocking behavior.

In comparison to the films according to DE-A-38 14 942, the films according to the present invention display reduced deposits on the rollers.

The terpolymer described under (c) above is preferably comprised of about 93.2 to 99.0% by weight of propylene, about 0.5 to 1.9% by weight of ethylene and about 0.5 to 4.9% by weight of the alpha-olefin, the percentages relating to the total weight of the terpolymer.

The base layer of the multilayer film is comprised of a propylene polymer having a melting point in the range of about 162° to 168° C. Isotactic polypropylene having an n-heptane-soluble fraction of 6% or less is preferably used. The polypropylene of the base layer in general has a melt flow index of about 1.5 to 5 g/10 min, measured under a load of 21.6N and at a temperature of 230° C., according to DIN 53 735.

The base layer preferably has a modulus of elasticity in the longitudinal direction of less than 3000 N/mm$^2$, more preferably less than 2800 N/mm$^2$ most preferably 2200 to 2800 N/mm$^2$. The modulus of elasticity in the transverse direction of the base layer is preferably less than 5200 N/mm$^2$, more preferably in the range of 4000 to 5100 N/mm$^2$. The modulus of elasticity is determined according to DIN 53,457 or ASTM-D 882, respectively.

The low-molecular weight resin contained in the base layer is a natural or synthetic resin having a softening point of $\geq$140° C. or a softening point of <140° C., preferably from 100° C. to 138° C., determined according to DIN 1995-U4, corresponding to ASTM E-28, and it is present in an amount of about 5 to 30% by weight, preferably of about 5 to 20% by weight, most preferably of about 5 to 10% by weight, relative to the total weight of the base layer. Surprisingly, it was found that as a result of incorporating a resin having a softening point in the range specified above into the polypropylene, the barrier properties of the films towards water vapor are substantially improved, and that at the same time the optical properties and also the shrink behavior of the film are favorably influenced. Moreover, the films according to this invention do not lead to deposits on rollers, e.g., during the longitudinal stretching. It has also been shown that as a result of their particular slip properties, the films of this invention are especially well-suited for use on high-speed packaging machines. The film surface is smooth enough to avoid so-called 'slip-stick' effects, i.e., irregular running speeds. On the other hand, the roughness of the film surface is sufficiently high to avoid jams prior to the actual slitting operation.

The amount and type of resin may be the same as described above and hereinafter.

From among the numerous low-molecular weight resins, preference is given to the hydrocarbon resins, in particular to the petroleum resins, styrene resins, cyclopentadiene resins and terpene resins (these resins are described in detail in 'Ullmanns Enzyklopädie der Technischen Chemie' (Ullmann's Encyclopedia of Technical Chemistry), 4th edition, vol. 2, pp. 539–553). The term 'petroleum resins' defines hydrocarbon resins produced by polymerization of deep-decomposed petroleum components in the presence of a catalyst. These petroleum materials usually contain a mixture of resin-forming substances, such as styrene, methylstyrene, vinyltoluene, indene, methylindene, butadiene, isoprene, piperylene and pentylene. The styrene resins are low-molecular weight styrene homopolymers or copolymers of styrene and other monomers, such as alpha-methylstyrene, vinyltoluene and butadiene. The cyclopentadiene resins are cyclopentadiene homopolymers or cyclopentadiene copolymers obtained from coal tar distillates and fractionated petroleum gas. The resins are produced by subjecting the cyclopentadiene-containing materials to high temperatures over a prolonged period of time. Depending on the reaction temperature, dimers, trimers or oligomers are obtained.

The terpene resins include polymers of terpenes, i.e., hydrocarbons of the formula $C_{10}H_{16}$, which are present in practically all etherial oils or oil-containing vegetal resins, and also phenol-modified terpene resins. Specific examples of suitable terpenes include alpha-pinene, beta-pinene, dipentene, limonene, myrcene, camphene and similar terpenes. The hydrocarbon resins may also be chosen from among the so-called modified hydrocarbon resins. Modification is generally performed by reacting the raw materials prior to polymerization, by introducing special monomers or by reacting the polymerized product, whereby preference is given to hydrogenations or partial hydrogenations.

Suitable hydrocarbon resins also include styrene homopolymers, styrene copolymers, cyclopentadiene homopolymers, cyclopentadiene copolymers and/or terpene polymers, which in each case have a softening point of $\geq 140°$ C. (among the unsaturated polymers, preference is given to the hydrogenated products). Particularly preferably, the cyclopentadiene homopolymers having a softening point of $\geq 140°$ C. are employed in the base layer.

If the top layer(s), too, are to contain a hydrocarbon resin, the resins listed above and the listed amounts for the base layer can be used. In this case, it is, also possible to employ hydrocarbon resins having a softening point of $\leq 140°$ C., such as between 100° C. and 138° C.

In order to further improve certain properties of the film according to this invention, effective amounts of suitable additives may be incorporated both in the base layer and in the top layer(s). Preferred additives include antistatic agents and/or antioxidants.

Straight-chain and saturated, aliphatic, tertiary amines, which possess a $C_{10}$ to $C_{20}$ aliphatic radical and two 2-hydroxy-($C_2$-$C_4$)alkyl groups are preferred antioxidants. N-($C_{10}$-$C_{20}$)-, and especially N-($C_{12}$-$C_{18}$)alkyl-N',N''-bis-(2-hydroxyethyl)-amines are employed particularly preferably.

The antioxidants employed preferably are so-called primary antioxidants, i.e., sterically hindered phenols or secondary amines, but it is also possible to use secondary antioxidants, such as, for example, thioethers or phosphites or phosphonites, or synergistic mixtures of primary and secondary antioxidants. Antioxidants of this generic type are described, for example, in Gächter/Müller: Kunststoff-Additive (Plastics Additives), Carl Hanser Verlag, 2nd edition (1983). Below, the structural formulae of a number of suitable compounds are given:

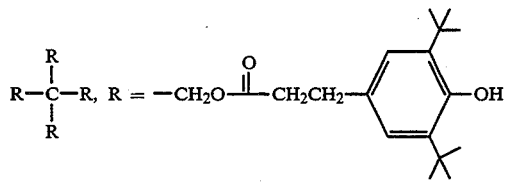

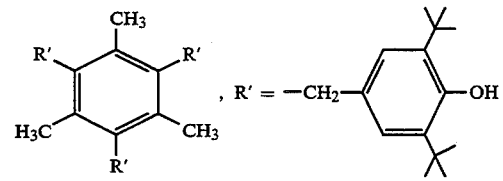

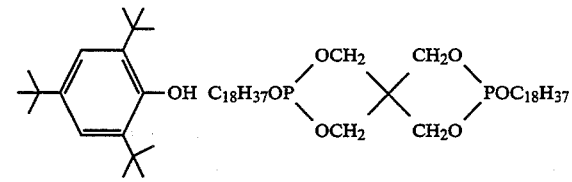

Preferred lubricants include carboxylic acid amides, such as erucic acid amide and stearic acid amide, or polydiorganylsiloxanes.

Suitable anti-blocking agents include, for example, organic polymers which are incompatible with the raw material employed for the top layer(s), such as polyamides, polyesters, polycarbonates and the like, or inorganic substances such as silicates, silicon dioxide and calcium carbonate. Inorganic substances, in particular silicon dioxide, with an average particle size of 1 to 6 μm, have found to be most suitable. These anti-blocking agents are added in amounts of about 0.1 to 1% by weight, preferably of about 0.15 to 0.5% by weight, relative to the weight of the top layer(s).

The thickness of the top layer(s) preferably varies between about 0.4 and 1.0 μm.

The parameters for producing the films according to this invention are expediently selected such that stretching in the longitudinal direction is performed at a temperature between about 100 and 130° C., preferably between about 105° and 120° C., and at a stretch ratio between about 1:4 and 1:6. Stretching in the transverse direction is performed at a temperature between about 120° and 160° C., preferably between about 130° and 150° C. The stretching ratio in the transverse direction is higher than about 1:7.5, and preferably it is in the range of about 1:8 to 1:11. Following the stretching state in the transverse direction, the film is heat-set. During this treatment the film is conveyed in the center frame, optionally in a slightly converging manner, at a temperature which is about 5° to 50° C. below the stretching temperature. Preferably, a convergence range of about 5 to 15% is set for the heat-setting treatment. Ready printability of the film is achieved by subjecting the film to one of the conventional treatments prior to winding, such as, for example, to a flame treatment or electrical corona treatment. Corona treatment by means of any of the known methods is expediently performed such that the film is passed between two conductor elements which serve as electrodes, whereby a voltage which is high enough to cause spray or corona discharges is applied between the electrodes. This usually is an alternating voltage of about 10,000 V and a frequency of about 10,000 Hz. As a result of these spray or corona discharges, the air above the film is ionized and reacts with the molecules of the film surface, so that polar inclusions are obtained in the essentially non-polar polymer matrix. The treatment intensities are within the usual range; preferably they are between 38 and 42 mN/m.

The invention will be illustrated in greater detail by way of the Examples which follow. A comparative survey is given in Table 1.

Example 1

A three-layered, transparent film having a total thickness of 20 μm was produced by coextrusion and subsequent orientation by biaxial stretching. The film had the layer build-up ABA, 'A' denoting the top layers and 'B' denoting the base layer. Each of the top layers was 0.6 μm thick.

The base layer was comprised of polypropylene to which 10% by weight of resin (ESCOREZ® ECR 356, supplied by Exxon, Darien, Connecticut, USA; softening point of the resin: 140° C.), relative to the total weight of the blend, had been added. The polypropylene had a melt flow viscosity of 3.5 g/10 min., determined according to DIN 53 735, under a load of 2.16 kg.

The top layers were comprised of a propylene/ethylene copolymer having an ethylene content of 4.8% by weight, to which 0.8% by weight of polydimethylsiloxane, 0.13% by weight of a phenolic stabilizer (Antioxidant 330, supplied by Ethyl Corp., Brussels, Belgium, and Baton Rouge, LA, USA), 0.075% by weight of calcium stearate and 0.33% by weight of SiO₂ having an average particle size of 2 μm, had been added. The polydimethylsiloxane had a kinematic viscosity of 30,000 mm²/sec; the propylene/ethylene copolymer had a melt flow viscosity of 6.0 g/10 min., measured according to DIN 53 735, under a load of 2.16 kg.

Example 2

A film was produced as described in Example 1, except that the resin content of the base layer was 20% by weight (same resin as in Example 1).

Example 3

A film was produced as described in Example 1, except that the resin content of the base layer was 30% by weight (same resin as in Example 1).

Example 4

A film was produced as described in Example 2, except that the layer build-up was ABC. Top layer 'A' had been corona-treated and did not contain any polydimethylsiloxane, whereas in top layer 'C' the polydimethylsiloxane content had been doubled. Layer B was the base layer.

Example 5

A film was produced as described in Example 2, except that the layer build-up was ABC. Top layer 'C' was comprised of a blend comprising an ethylene/propylene copolymer with an addition of 10% by weight of the resin employed in Example 1.

Example 6

A film was produced as described in Example 1 except that the resin was REGALITE® R101 (Hercules) having a softening point of 100° C.

Example 7

A film was produced as described in Example 1 except that the resin was REGALREZ® 1128 (Hercules) having a softening point of 130° C.

Comparative Example 1 (C1)

A film was produced as described in Example 1, but without the addition of the resin.

Comparative Example 2 (C2)

A film was produced as described in Example 1, except that a resin having a softening point of 85° C. was employed (ESCOREZ® 5380, supplied by Exxon).

Comparative Example 3 (C3)

A film was produced as described in Example 2, except that no SiO₂ was contained in the top layers.

In Table 1 below, the properties of the films described in the Examples and Comparative Examples are expressed in numerical values or rated as follows:

++ = very good or no resin deposition on the rollers
+ = good or hardly any resin deposition on the rollers
− = poor or noticeable resin deposition on the rollers
− − = unacceptable or severe resin deposition on the rollers

Determination of Thermal Blocking

To determine the thermal blocking properties, two wooden blocks (72 mm×41 mm×13 mm), to one surface of which a piece of felt had been glued, are wrapped into a sample of the film to be tested and sealed. The two blocks are stacked on top of one another, with the felt-clad surfaces facing each other, and loaded with a weight of 200 g. This arrangement is put in an oven preheated to 70° C. and left there for two hours. Then the temperature is reduced to room temperature (21° C.) for 30 minutes and the weight is lifted off from the wooden blocks. By means of a mechanical appliance the upper block is removed from the lower block. Evaluation is performed over the course of 4 individual measurements, from which the maximum take-down force (measured in N) is determined.

The requirements of the specification are fulfilled if none of the individual measurements exceeds 5N.

Determination of Haze

The haze of the film is determined by a method similar to ASTM-D 1003-52, whereby a 1° slot aperture is used instead of the 4° round aperture, and the haze is indicated for four superimposed films, because in this way measurement can be performed within the optimum range. Haze is evaluated as follows:

up to 15%: very good
15 to 25%: moderate
over 25%: unsatisfactory

Determination of Gloss

The gloss of the films is determined according to DIN 67 530. The reflector value is measured as an optical quantity for the surface of a film. In accordance with the ASTM-D 523-78 and ISO 2813 standards, the angle of radiation incidence is adjusted to 20°. A light beam hits the planar test surface at the set angle of incidence and is reflected or scattered by the test surface. The light beams incident on the photoelectronic receiver are indicated as a proportional electrical quantity. The measured value is dimensionless and must be given with the angle of incidence. The gloss (angle of incidence 20°) is evaluated using the following ratings:

down to 115: very good
115 to 100: moderate, and
less than 100: poor

Determination of Modulus of Elasticity

The modulus of elasticity is determined according to DIN 53,457 or ASTM-D 882.

Determination of Shrink

The shrink of a film is defined as the percental change in length ($l_0$-l/$l_0$). Square film samples having a side length of 10 cm ($l_0$) are heated to a temperature of 120° C. for five minutes. Then the remaining length (1) is measured.

Determination of Permeability to Water Vapor and Oxygen

The permeability to water vapor is determined in accordance with DIN 53 122, part 2.

The barrier effect towards oxygen is measured according to draft standard DIN 53 380, part 3, at an atmospheric moisture content of 53%.

The Table shows that with regard to the desired combination of properties, the films according to the present invention are superior to the films according to the Comparative Examples.

TABLE 1

| Example | WVP (g/m² · d) in % | O₂-Perm. (cm³/m² · d · bar) in % | Shrink 120° C., 5 min in % longit./transv. | Friction DIN 53375 | Thermal Blocking (N) | Optical Properties Haze/Gloss | Resin Depos. on Rollers | Machine Runnability |
|---|---|---|---|---|---|---|---|---|
| 1 | 0.89 | 1080 | 5/2 | 0.35 | 1 | 19/130 | + | ++ |
| 2 | 0.79 | 770 | 7/3 | 0.35 | 1 | 18/125 | + | ++ |
| 3 | 0.66 | 750 | 10/3 | 0.35 | 1 | 15/130 | + | ++ |
| 4 | 0.79 | 770 | 7/3 | 0.35 | 1 | 19/125 | + | ++ |
| 5 | 0.70 | 760 | 7/3 | 0.35 | 0.8 | 17/130 | + | ++ |
| 6 | 0.93 | 1050 | 7/2 | 0.35 | 1 | 171125 | + | ++ |
| 7 | 0.95 | 1100 | 6/3 | 0.35 | 1 | 18/128 | + | ++ |
| C1 | 1.40 | 1800 | 3/1 | 0.35 | 1 | 25/115 | ++ | ++ |
| C2 | 0.85 | 1200 | 10/5 | 0.35 | 1 | 21/120 | — | ++ |
| C3 | 0.79 | 1150 | 7/3 | 0.45 | 5 | 20/130 | ++ | — |

WVP: Permeability to water vapor
O₂-Perm.: Permeability to oxygen
Friction: Determined according to DIN 53 375
Resin deposition on the rollers and machine runnability were evaluated by subjective visual inspection.

What is claimed is:

1. A sealable film comprising
   i) a base layer comprising polypropylene and a hydrocarbon resin having a softening point of at least 140° C., and
   ii) a top layer comprising
      a) an ethylene/propylene copolymer having an ethylene content of not more than about 10% by weight, or
      b) a propylene/1-butene copolymer, or
      c) a propylene/ethylene/alpha-olefin terpolymer, or
      d) a blend of two or more of a), b) and c),
   wherein said top layer has a thickness of about 0.4 to about 1.0 μm and comprises a hydrocarbon resin and an antiblocking agent with an average particle size of 1 to 6 μm.

2. A sealable film as claimed in claim 1, wherein ii) comprises a propylene/1-butene copolymer b) which has a 1-butene content of about 10 to 15% by weight.

3. A sealable film as claimed in claim 1, wherein ii) comprises c) and said alpha-olefin is an alpha-olefin having 4 to 10 carbon atoms.

4. A sealable film as claimed in claim 3, wherein said alpha-olefin contained in said terpolymer c) is selected from the group consisting of 1-butene, 1-pentene and 1-hexene.

5. A sealable film as claimed in claim 1, wherein ii) comprises said terpolymer c) which comprises about 93.2 to 99.0% by weight of propylene, about 0.5 to 1.9% by weight of ethylene and about 0.5 to 4.9% by weight of alpha-olefin.

6. A sealable film as claimed in claim 1, wherein said hydrocarbon resin is contained in said base layer in an amount of about 5 to 30% by weight.

7. A sealable film as claimed in claim 6, wherein said hydrocarbon resin is contained in said base layer in an amount of about 10 to 20% by weight.

8. A sealable film as claimed in claim 1, wherein said hydrocarbon resin of said base layer is selected from the group consisting of petroleum resins, styrene resins, cyclopentadiene resins and terpene resins.

9. A sealable film as claimed in claim 8, wherein said hydrocarbon resin of said base layer is a cyclopentadiene resin.

10. A sealable film as claimed in claim 1, wherein the hydrocarbon resin which is contained in the top layer has a softening point of $\leq 140°$ C.

11. A sealable film as claimed in claim 1, wherein the hydrocarbon resin in the top layer has a softening point of at least 140° C.

12. A sealable film as claimed in claim 1, wherein the hydrocarbon resin in the top layer has a softening point of between 100° and 138° C.

13. A sealable film as claimed in claim 1, wherein said hydrocarbon resin is contained in said top layer in an amount of about 5 to 30% by weight.

14. A sealable film as claimed in claim 13, wherein the hydrocarbon resin is contained in said top layer in an amount of about 10 to 20% by weight.

15. A sealable film as claimed in claim 1, wherein said hydrocarbon resin contained in said top layer is selected from the group consisting of petroleum resins, styrene resins, cyclopentadiene resins and terpene resins.

16. A sealable film as claimed in claim 15, wherein said hydrocarbon resin in the top layer is a cyclopentadiene resin.

17. A sealable film as claimed in claim 1, wherein at least one of said base layer and said top layer contains an antistatic agent or an antioxidant.

18. A sealable film as claimed in claim 17, wherein said film contains an antioxidant which is a primary or secondary antioxidant.

19. A sealable film as claimed in claim 1, wherein the antiblocking agent is selected from the group consisting of silicates, $SiO_2$ and calcium carbonate.

20. A sealable film as claimed in claim 1, wherein the film contain a lubricant which is a carboxylic acid amide or a polydiorganylsiloxane.

21. A sealable film as claimed in claim 1, wherein said film is comprised of one base layer and two top layers.

22. A sealable film as claimed in claim 21, wherein each side of said base layer is covered by a top layer.

23. A packaging material comprising a sealable film as claimed in claim 1.

24. A sealable film as claimed in claim 1, wherein said base layer has a modulus of elasticity in the longitudinal direction of less than 3000 N/mm$^2$ and a modulus of elasticity in the transverse direction of less than 5200 N/mm$^2$.

25. A sealable film as claimed in claim 24, wherein the modulus of elasticity in the longitudinal direction is less than 2800 N/mm$^2$ and in the transverse direction is in the range from 4000 to 5100 N/mm$^2$.

26. A sealable film as claimed in claim 1, wherein said top layer comprises 0.1 to 1% by weight, relative to the weight of the top layer, of said antiblocking agent.

27. A sealable film comprising
   i) a base layer comprising polypropylene and a hydrocarbon resin having a softening point of less than 140° C., and
   ii) a top layer comprising
      a) an ethylene/propylene copolymer having an ethylene content of not more than about 10% by weight, or
      b) a propylene/1-butene copolymer, or
      c) a propylene/ethylene/alpha-olefin terpolymer, or
      d) a blend of two or more of a), b) and c),
   wherein said top layer has a thickness of about 0.4 to about 1.0μm and comprises a hydrocarbon resin and an antiblocking agent with an average particle size of 1 to 6 μm.

28. A sealable film as claimed in claim 27, wherein said hydrocarbon resin of said base layer has a softening point of between about 100° and 138° C.

29. A sealable film as claimed in claim 27, wherein ii) comprises a propylene/1-butene copolymer b) which has a 1-butene content of about 10 to 15% by weight.

30. A sealable film as claimed in claim 27, wherein ii) comprises c) and said alpha-olefin is an alpha-olefin having 4 to 10 carbon atoms.

31. A sealable film as claimed in claim 30, wherein said alpha-olefin contained in said terpolymer c) is selected from the group consisting of 1-butene, 1-pentene and 1-hexene.

32. A sealable film as claimed in claim 27, wherein ii) comprises said terpolymer c) which comprises about 93.2 to 99.0% by weight of propylene, about 0.5 to 1.9% by weight of ethylene and about 0.5 to 4.9% by weight of alpha-olefin.

33. A sealable film as claimed in claim 27, wherein said hydrocarbon resin is contained in said base layer in an amount of about 5 to 30% by weight.

34. A sealable film as claimed in claim 27, wherein said hydrocarbon resin is contained in said base layer in an amount of about 10 to 20% by weight.

35. A sealable film as claimed in claim 27, wherein said hydrocarbon resin of said base layer is selected from the group consisting of petroleum resins, styrene resins, cyclopentadiene resins and terpene resins.

36. A sealable film as claimed in claim 27, wherein said hydrocarbon resin of said base layer is a cyclopentadiene resin.

37. A sealable film as claimed in claim 27, wherein the hydrocarbon resin which is contained in the top layer has a softening point of $\leq 140°$ C.

38. A sealable film as claimed in claim 27, wherein the hydrocarbon resin in the top layer has a softening point of at least 140° C.

39. A sealable film as claimed in claim 27, wherein the hydrocarbon resin in the top layer has a softening point of between 100° and 138° C.

40. A sealable film as claimed in claim 27, wherein said hydrocarbon resin is contained in said top layer in an amount of about 5 to 30% by weight.

41. A sealable film as claimed in claim 27, wherein the hydrocarbon resin is contained in said top layer in an amount of about 10 to 20% by weight.

42. A sealable film as claimed in claim 27, wherein said hydrocarbon resin contained in said top layer is selected from the group consisting of petroleum resins, styrene resins, cyclopentadiene resins and terpene resins.

43. A sealable film as claimed in claim 27, wherein said hydrocarbon resin in the top layer is a cyclopentadiene resin.

44. A sealable film as claimed in claim 27, wherein at least one of said base layer and said top layer contains an antistatic agent or an antioxidant.

45. A sealable film as claimed in claim 27, wherein said film contains an antioxidant which is a primary or secondary antioxidant.

46. A sealable film as claimed in claim 27, wherein the antiblocking agent is selected from the group consisting of silicates, $SiO_2$ and calcium carbonate.

47. A sealable film as claimed in claim 27, wherein the film contain a lubricant which is a carboxylic acid amide or a polydiorganylsiloxane.

48. A sealable film as claimed in claim 27, wherein said film is comprised of one base layer and two top layers.

49. A sealable film as claimed in claim 27, wherein each side of said base layer is covered by a top layer.

50. A packaging material comprising a sealable film as claimed in claim 27.

51. A sealable film as claimed in claim 27, wherein said base layer has a modulus of elasticity in the longitudinal direction of less than 3000 $N/mm^2$ and in the transverse direction of less than 5200 $N/mm^2$.

52. A sealable film as claimed in claim 27, wherein the modulus of elasticity in the longitudinal direction is less than 2500 $N/mm^2$ and in the transverse direction is in the range from 4000 to 5100 $N/mm^2$.

53. A sealable film as claimed in claim 27, wherein said top layer comprises 0.1 to 1% by weight, relative to the weight of the top layer, of said antiblocking agent.

* * * * *